(12) United States Patent
Samide et al.

(10) Patent No.: US 7,160,440 B2
(45) Date of Patent: Jan. 9, 2007

(54) STORM WATER SEPARATOR SYSTEM

(75) Inventors: Gerald W. Samide, Edmonton (CA); David Martz, Edmonton (CA)

(73) Assignee: Sameng Inc., Edmondton (CA)

( * ) Notice: Subject to any disclaimer, the term of this patent is extended or adjusted under 35 U.S.C. 154(b) by 408 days.

(21) Appl. No.: 10/715,067

(22) Filed: Nov. 17, 2003

(65) Prior Publication Data

US 2005/0103718 A1    May 19, 2005

(51) Int. Cl.
B01D 21/24    (2006.01)

(52) U.S. Cl. .................. 210/97; 210/170; 210/521

(58) Field of Classification Search ............ 210/184.2, 210/538, 521, 170, 97; 404/4; 405/184.2
See application file for complete search history.

(56) References Cited

U.S. PATENT DOCUMENTS

| | | | |
|---|---|---|---|
| 601,794 A * | 4/1898 | Hershberger ................ | 405/40 |
| 712,194 A | 10/1902 | Kelly | |
| 1,962,830 A * | 6/1934 | Metzler ..................... | 405/281 |
| 2,058,044 A * | 10/1936 | Spencer ..................... | 210/533 |
| 2,249,818 A * | 7/1941 | Gifford ..................... | 405/276 |
| 2,730,190 A | 1/1956 | Brown ...................... | 183/2.7 |
| 3,285,422 A | 11/1966 | Wiley ....................... | 210/512 |
| 3,968,036 A | 7/1976 | Liles et al. .................. | 210/15 |
| 5,494,585 A | 2/1996 | Cox ......................... | 210/748 |
| 5,543,064 A | 8/1996 | Batten ....................... | 210/803 |
| 5,725,760 A | 3/1998 | Monteith .................... | 210/170 |
| 5,759,415 A | 6/1998 | Adams ...................... | 210/776 |
| 5,849,181 A | 12/1998 | Monteith .................... | 210/163 |
| 5,944,058 A * | 8/1999 | Kamiyama et al. .......... | 138/98 |
| 6,062,767 A | 5/2000 | Kizhnerman et al. ........ | 405/39 |
| 6,077,448 A | 6/2000 | Tran-Quoc-Nam et al. .. | 210/790 |
| 6,120,684 A | 9/2000 | Kistner et al. .............. | 210/163 |
| 6,129,839 A | 10/2000 | Mains, Jr. .................. | 210/188 |
| 6,190,545 B1 | 2/2001 | Williamson ................. | 210/155 |
| 6,315,131 B1 | 11/2001 | Terrien et al. ............. | 210/519 |
| 6,371,690 B1 | 4/2002 | Monteith .................... | 405/39 |
| 6,428,629 B1 | 8/2002 | Happel ...................... | 210/155 |
| 6,547,962 B1 | 4/2003 | Kistner et al. .............. | 210/170 |

* cited by examiner

*Primary Examiner*—Terry K. Cecil
(74) *Attorney, Agent, or Firm*—Conley Rose P.C.

(57) ABSTRACT

A storm water separator system having side walls constructed from sheet piling to enable installation within a small footprint and in poor soil conditions. The separator system has an upper bypass chamber and a lower treatment chamber with a diffuser directing inflowing water down into the lower chamber. A flow control orifice between the two chambers near an outlet orifice in the side wall controls the quantity of flow through the lower chamber. Excess flow bypasses treatment and passes through the upper chamber.

17 Claims, 6 Drawing Sheets

STORM WATER SEPARATOR SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

Field of the Invention

This invention relates to a separator system for treating storm water and, in particular, a separator system for the entrainment of floating matter and sediment.

BACKGROUND OF THE INVENTION

Storm water sewer systems typically include separator systems for reducing the amount of sediment and/or oils or other hydrocarbons present in the storm water. Because most storm water sewer systems release the storm water into a natural watercourse, such as a river, the sediments and oils can have a negative environmental impact upon the area. Sediments will tend to build up a delta and other barriers that impact the flow dynamics of the watercourse, thereby impacting upon aquatic life. Therefore, separator systems are placed throughout the storm water sewer system.

Among known separator systems are hydrodynamic separators. Some of the drawbacks of hydrodynamic separators include their low capacity, high cost, and required maintenance.

An alternative separator system is a multi-chambered separator system. Known multi-chambered separator systems have difficulty dealing with high flow rate storm water. These systems encounter re-suspension problems during high flow occurrences wherein previously captured sediment is remixed or pooled floating hydrocarbons are remixed. Some systems attempt to address this problem by completely bypassing entrainment during a high flow event and allowing full untreated flow out of the system.

Another drawback with known systems is their large footprint. The systems are located underground and require significant excavation to construct, which present difficulties in areas with limited space and with utilities or other structures in the immediate area. A related problem is that existing systems are difficult to accommodate in poor soil conditions, such as excessively soft wet soil.

SUMMARY OF THE INVENTION

The present invention provides a separator system capable of installation within a small footprint and in poor soil conditions as a result of the use of sheet piling to establish the sidewalls of the separator system.

In one aspect, the present invention provides a separator system that includes a tank having a bottom and at least one sidewall, the at least one sidewall including sheet piling, the tank including a mid-deck defining an upper chamber and a lower chamber within the tank, the sidewall having an inlet orifice and an outlet orifice within the upper chamber and proximate the mid-deck; and a diffuser located proximate the inlet orifice, the diffuser providing fluid communication between the upper chamber and the lower chamber through the mid-deck, wherein the mid-deck defines a flow control orifice disposed proximate the outlet orifice, the flow control orifice providing fluid communication between the upper chamber and the lower chamber.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which:

FIG. 9 shows a cross-sectional view of a collar in use with a flow control pipe.

Similar numerals are used in different figures to denote similar components.

DESCRIPTION OF SPECIFIC EMBODIMENTS

The highest sediment and oil concentration occurs in the first 10 to 15 mm of rainfall, i.e. the "first flush" of storm runoff, as the rainwater draws in any deposits of material found on the ground surface and flushes them into the storm sewer system. Therefore, it is especially desirable to treat this first flood of rainwater effectively. Later in the rainstorm the concentration of pollutants in the runoff is typically much lower, and therefore the treatment of storm sewer water later in the storm event is less critical.

Figure 1:
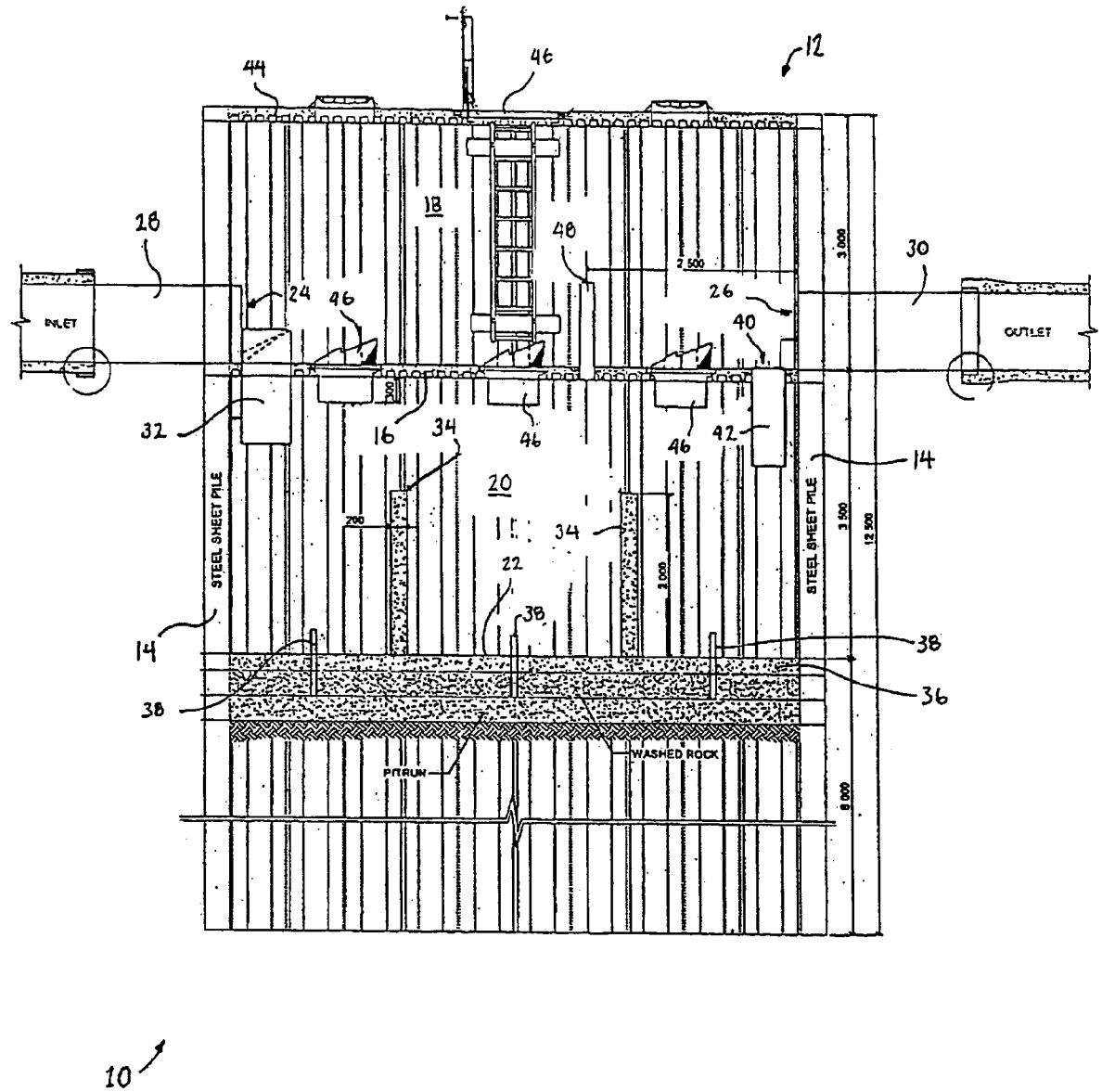
FIG. 1 shows a cross-sectional side view of an embodiment of a separator system according to the present invention.
Figure 2:
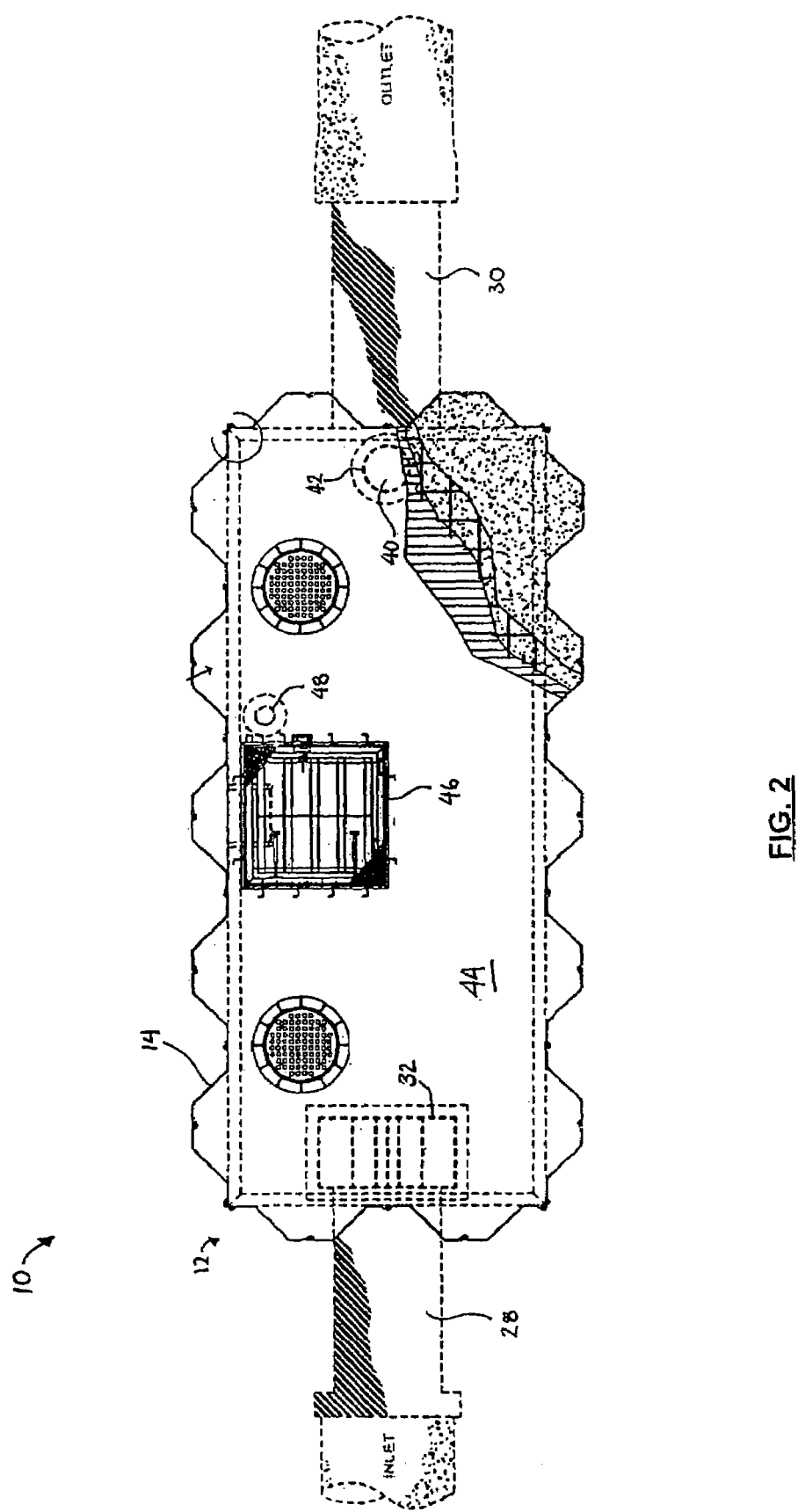
FIG. 2 shows a top plan view of the separator system.
Figure 3:
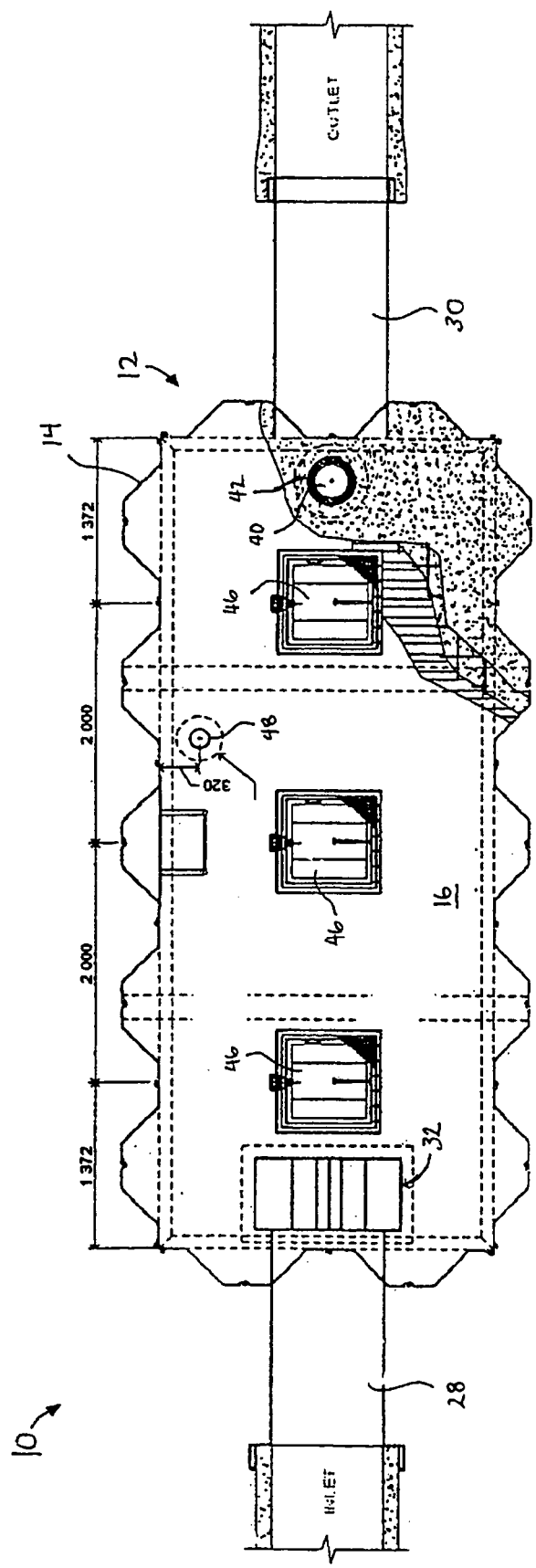
FIG. 3 shows an interior plan view from above a mid-deck of the separator system.
Figure 4:
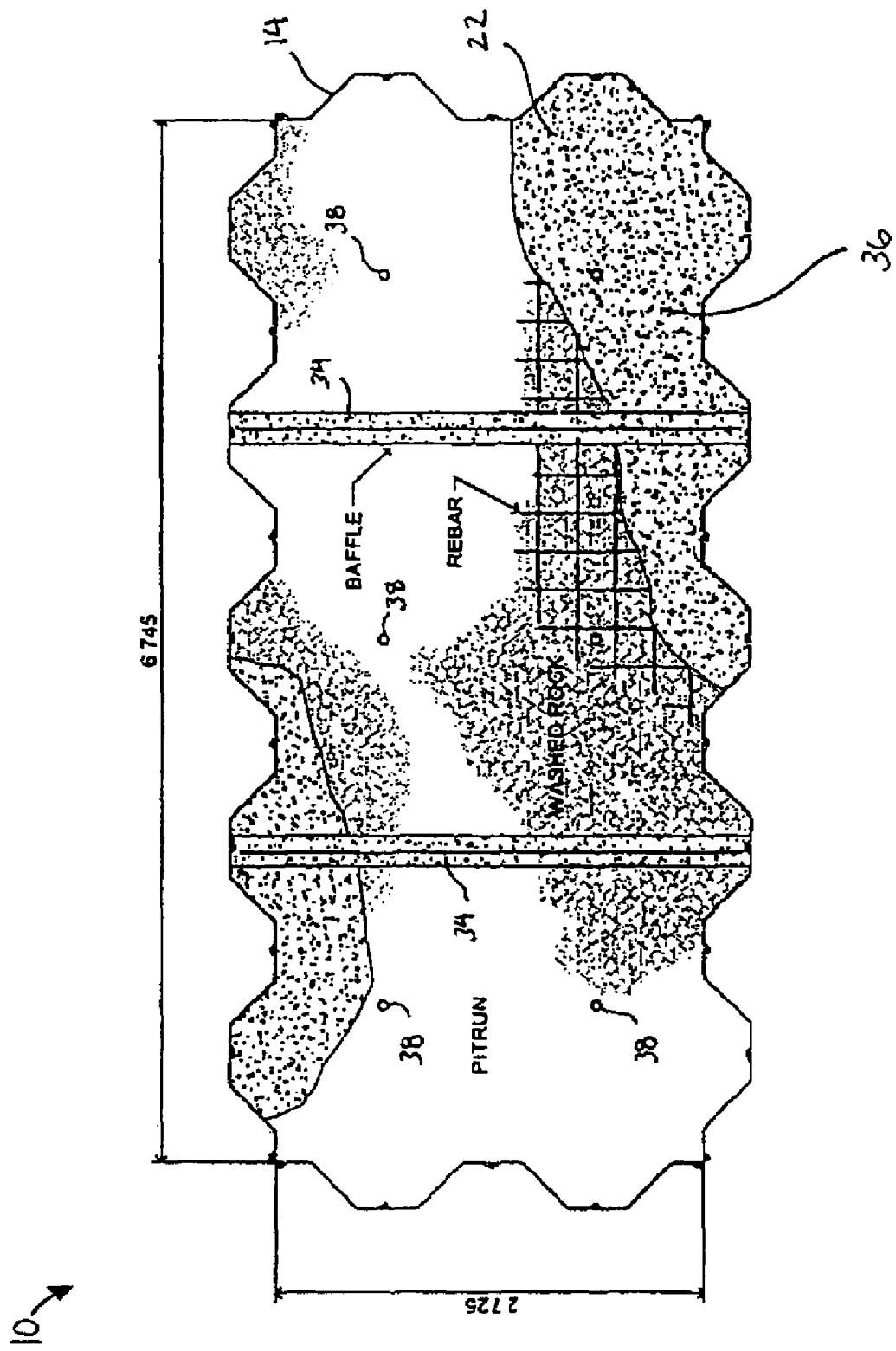
FIG. 4 shows a base plan view from below the mid-deck of the separator system.

Reference is first made to FIGS. 1 through 4. FIG. 1 shows a cross-sectional side view of an embodiment of a separator system 10 according to the present invention. FIG. 2 shows a top plan view of the separator system 10. FIG. 3 shows an interior plan view from above a mid-deck 16 of the separator system 10. FIG. 4 shows a base plan view from below the mid-deck 16 of the separator system 10.

The separator system 10 includes a tank 12 having sidewalls 14 constructed of sheet piling. The tank 12 includes the mid-deck 16 dividing the tank 12 into an upper chamber 18 and a lower chamber 20. The tank 12 also includes a bottom 22.

In one embodiment the sheet piling is steel sheet piling, although other types of sheet piling may be employed as appropriate to a particular application, including but not limited to vinyl sheet piling, fibreglass sheet piling, and others. Although the present embodiment employs Z-type sheet piling, other types may also be used including but not limited to U-type and flat-type. The present embodiment uses a single jaw interlock to couple the sheets of sheet piling together, although it will be understood that other interlocks may be used, including but not limited to ball and socket, double jaw, double hook, thumb and finger, and hook and grip.

The use of sheet piling in creating the sidewalls 14 assists in minimizing the footprint of the separator system 10 and the impact that installation has upon the surrounding environment. The sheet piling is driven to a depth well below the bottom 22 of the tank 12. Once the sheet piling has been driven into place in the configuration of the circumference of the tank 12, then the interior of the tank 12 is excavated to a base below the location of the bottom 22. As the excavation proceeds, appropriate bracing may be placed around the interior of the side walls 14 to aid against inward deflection of the sheet piling.

In one embodiment, the base of the excavated area is then back filled with a layer of pit run and a layer of washed rock. The bottom 22 of the tank is established by pouring a concrete slab 36. The concrete slab 36 is poured to incorporate a seepage mechanism, which, in one embodiment, is a pressure relief pipe 38. The pressure relief pipe 38 provides fluid communication between the interior of the tank 12 and the ground below the concrete slab 36 to allow for limited drainage or seepage of fluid out of the tank 12 and into the ground. The pressure relief pipe 38 may feature a plurality of perforations (not shown) throughout its lower end in the vicinity of the washed rock layer or the pit run layer. This lower end may be wrapped in a filter cloth to prevent clogging of the perforations. The top of the pressure relief pipe 38 may be positioned above the surface of the bottom 22 to prevent significant collected sediment on the bottom 22 from entering the pressure relief pipe 38.

The sidewalls 14 define an inlet orifice 24 and an outlet orifice 26. The inlet orifice 24 and the outlet orifice 26 are disposed within the upper chamber 18 portion of the sidewalls 14 and are located proximate the mid-deck 16. In one embodiment, the inlet orifice 24 and the outlet orifice 26 are both adjacent the mid-deck 16. The mid-deck may be constructed of any suitable material and secured to the sidewalls 14 in any suitable manner, as will be appreciated by one of ordinary skill in the art. In one embodiment, the mid-deck is formed from a decking upon which a layer of reinforced concrete is cured.

The upper end of the tank 12 is closed by a top deck 44. The top deck 44 seals the upper end of the tank 12 and is secured to the upper ends of the sidewalls 14. The top deck 44 may incorporate a grating for collecting runoff from a gutter or roadway. The top deck 44 and the mid-deck 16 may also include access hatches 46 to permit access to the interior of the tank 12.

The inlet orifice 24 and the outlet orifice 26 may have an inlet pipe 28 and an outlet pipe 30, respectively, extending outwards therefrom. The inlet pipe 28 and the outlet pipe 30 are each intended to be coupled to existing in-ground sewer pipes. In one embodiment, the inlet pipe 28 and the outlet pipe 30 are constructed of steel, the in-ground sewer pipes are concrete, and they are coupled together using modular seals.

The separator system 10 further includes baffles 34 within the lower chamber 20. The baffles 34 extend upwards from the bottom 22 of the tank 12 and are positioned transverse to the flow direction between the inlet orifice 24 and the outlet orifice 26. It will be understood that the baffles 34 assist in encouraging settlement of sediment within the lower chamber 20 on the bottom 22 of the tank 12. The baffles 34 may be constructed of any suitable material including, but not limited to, concrete and rebar.

The separator system 10 includes a diffuser 32 located proximate the mouth of the inlet orifice 24. The diffuser 32 provides fluid communication between the upper chamber 18 and the lower chamber 20. In particular, the diffuser 32 directs water flow incoming from the inlet orifice 24 down into the lower chamber 20.

Figure 5:
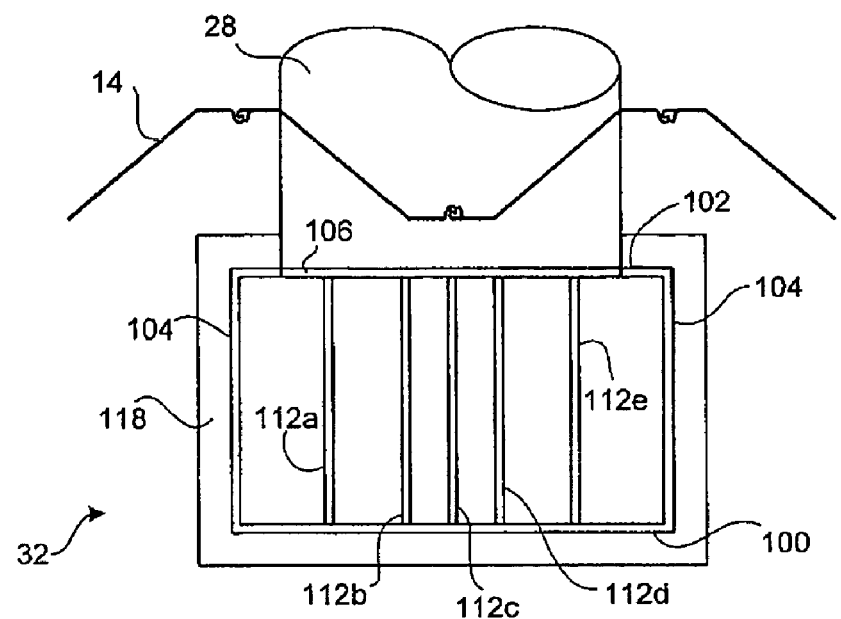
FIG. 5 shows a top view of an embodiment of a diffuser for use in the separator system.
Figure 6:
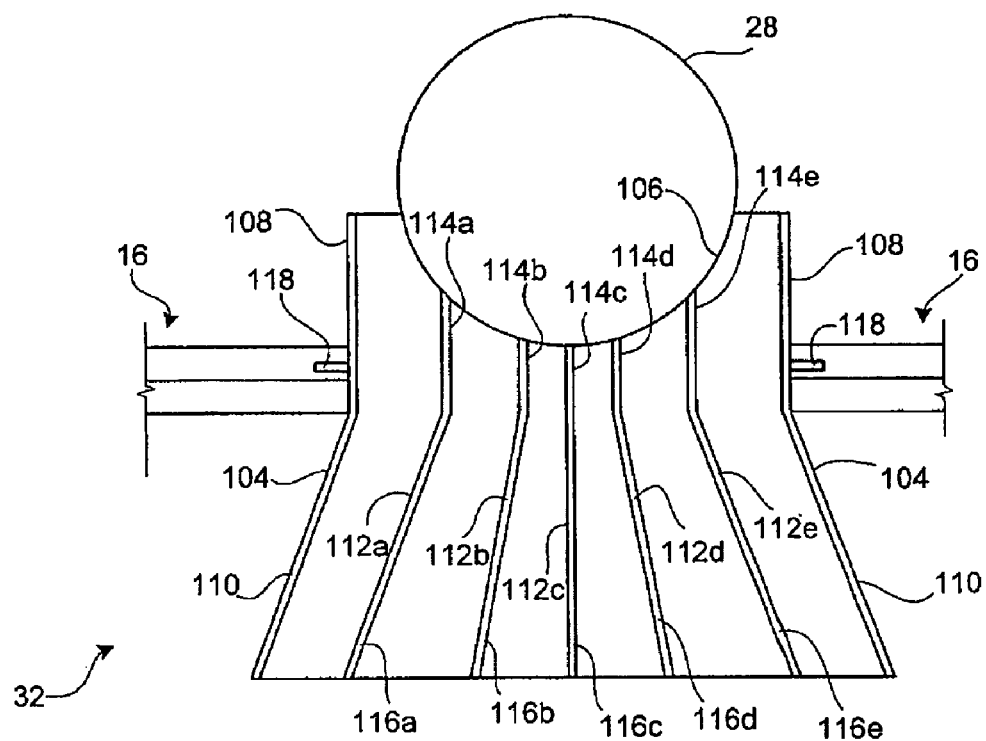
FIG. 6 shows a cross-sectional front view of the diffuser.
Figure 7:
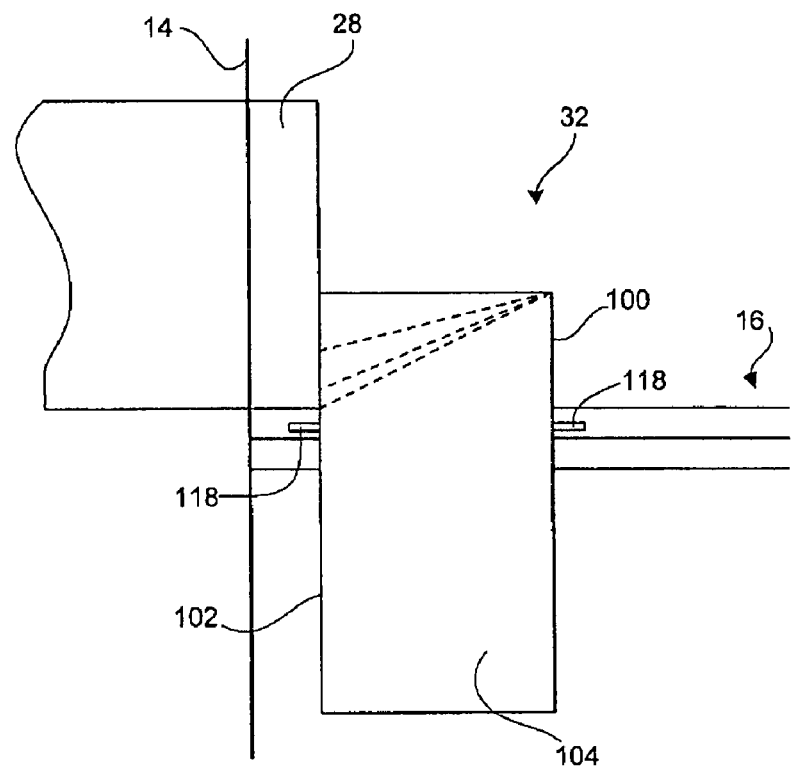
FIG. 7 shows a side view of the diffuser.
Figure 8:
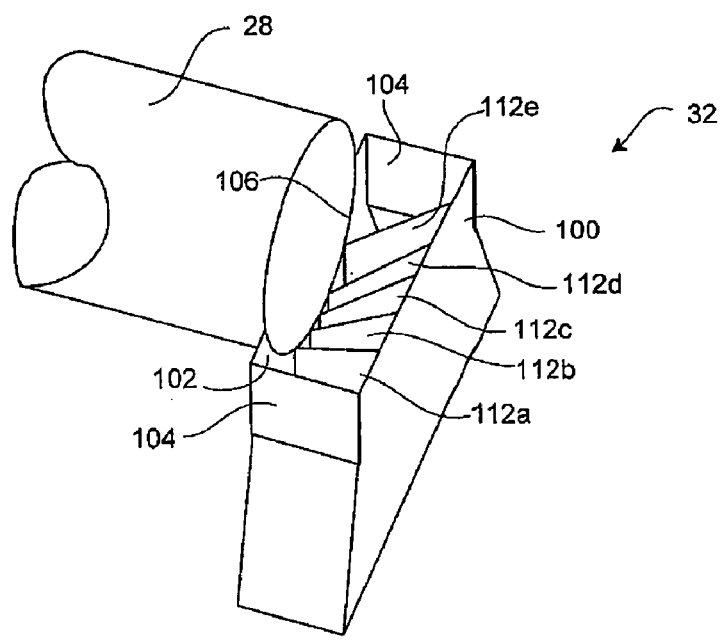
FIG. 8 shows an orthographic view of the diffuser.

Reference is now made to FIGS. 5 through 8. FIG. 5 shows a top view of the diffuser 32. FIG. 6 shows a cross-sectional front view of the diffuser 32. FIG. 7 shows a side view of the diffuser 32. FIG. 8 shows an orthographic view of the diffuser 32.

The diffuser 32 includes a front wall 100, a back wall 102, and sidewalls 104 assembled in a box shape. The upper end of the back wall 102 defines a partial circular cutout 106 that registers with the diameter of the inlet pipe 28 (conformingly contacts therewith). The walls 100, 102, and 104 extend downwards. The sidewalls 104 each include a top portion 108 that extends downwards and a bottom portion 110 that meets the lower end of the top portion 108 and flares outwards and downwards, as shown in FIG. 6.

The diffuser 32 includes vanes 112 (shown individually as 112a, 122b, . . . , 112e) formed by interior walls extending between the front wall 100 and the back wall 102 and spaced apart from the side walls 104. Each of the vanes 112 includes an upper portion 114 and a lower portion 116. The upper portion 114 of each vane 112 is parallel to the top portion 108 of the sidewalls 104. The lower portions 116 of at least some of the vanes 112 are flared or angled outwardly so as to direct a portion of the fluid flow through the diffuser 32 outwards and downwards, thereby spreading or diffusing the fluid flow descending through the diffuser 32 into the lower chamber 20 (FIG. 1).

The lower portions 116 of vanes 112 closer to the bottom portions 110 of the sidewalls 104 are angled or flared more acutely than the lower portions 116 of vanes 112 located near the centreline of the diffuser 32, equidistant between the two sidewalls 104.

The diffuser 32 aids in transitioning the storm water flow from the inlet pipe 28 into the lower chamber 20 without causing excess turbulence. Accordingly, the diffuser 32 lessens the possibility that turbulence from inflowing storm water will re-suspend particulate matter, i.e. sediment, that was collected along the bottom 22 (FIG. 1) of the lower chamber, or re-mix any floating matter, such as oils or other hydrocarbons.

The diffuser 32 may include an outwardly extending flange 118 for mounting the diffuser 32 to the mid-deck 16 (FIG. 1).

Referring again to FIGS. 1 through 4, the mid-deck 16 features a flow control orifice 40. The flow control orifice 40 provides fluid communication between the upper chamber 18 and the lower chamber 20 and is located proximate the outlet orifice 26. The flow control orifice 40 maybe defined by a flow control pipe 42 fitted into the mid-deck 16. The flow control pipe 42 extends downwards into the lower chamber 20 so as to prevent the uptake of materials that may be floating within the lower chamber 20 against the undersurface of the mid-deck 16. In one embodiment, the upper end of the flow control pipe 42 includes an inwardly extending flange having a set of bolt holes (not shown). Collars of various sizes may be attached to the inwardly extending flange using bolts, as illustrated by the cross-sectional view of a collar 99 in use with the flow control pipe 42 shown in FIG. 9. The collars customize the size of the flow control orifice 40 for a particular installation.

The inner diameter of the flow control orifice 40 determines the balance between storm water flows through the lower chamber 20 and through the upper chamber 18 when a bypass situation is encountered during high flows. High volume flows are initially directed into the lower chamber 20 by the diffuser 32 during the beginning of a rainstorm. When the lower chamber 20 is at capacity, the rate of inflow to the lower chamber 20 through the diffuser 32 is governed by the rate of outflow from the lower chamber 20 through the flow control orifice 40. The size of the flow control orifice 40 thus determines the extent to which storm water is treated in the lower chamber 20 during high flow conditions. Any excess inflow from the inlet pipe 28 through the inlet orifice 24 bypasses the diffuser 32 and flows to the outlet orifice 26 over the mid-deck 16. Therefore, even under high flow conditions, a portion of the incoming storm water is treated through the lower chamber 20, and the volume of that portion is determined by the diameter of the flow control orifice 40. Accordingly, the separator system 10 treats the "first flush" effectively while allowing for bypass of later high flow volume. Even under bypass conditions, a portion of the storm water flow is treated by the lower chamber 20. Moreover, the portion of the storm water that enters the lower chamber 20 tends to be the flow proximate the bottom of the inlet pipe 28, which is the flow that is most likely to contain sediment material requiring treatment in the lower chamber 20.

Referring still to FIGS. 1 through 4, the separator system 10 may include an oil retrieval pipe 48 for extracting oils and other hydrocarbons that may be pooled on the surface of the water collected in the lower chamber 20. The oil retrieval pipe 48 extends above the upper surface of the mid-deck 16 and provides for fluid communication between the upper chamber 18 and the lower chamber 20. It provides an access point through which a hose may be inserted in order to pump out the oils and other hydrocarbons.

It will be understood that, although embodiments of the present invention discussed herein show the tank 12 in a rectangular shape, other shapes are also possible, including but not limited to circles, ellipses, square and other shapes. Sheet piling of a type appropriate to the configuration of the tank should be selected.

Those of ordinary skill in the art will also appreciate that various modifications may be made to customize the separator system 10 to a particular installation. For example, the number and placement of the baffles 34 may depend upon the expected type and quantity of sediment present in the storm water, which depends upon the environment in which the separator system 10 is used. In some embodiments, no baffles 34 may be needed. Other modifications will be within the understanding of those of ordinary skill in the art having regard to the foregoing description.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A separator system, comprising:
    a tank having a bottom and at least one sidewall, said at least one sidewall including sheet piling, said tank including a mid-deck defining an upper chamber and a lower chamber within said tank, said sidewall having (i) an inlet pipe extending therethrough into said chamber and defining an inlet orifice, and (ii) an outlet orifice, wherein both orifices are within said upper chamber and proximate said mid-deck; and
    a diffuser providing fluid communication between said upper chamber and said lower chamber through said mid-deck and for diffusing fluid flow descending through the diffuser into said lower chamber, said diffuser having walls and vanes extending above said mid-deck including a front wall adjacent said inlet orifice having a cutout portion sized and shaped such that said front wall conformingly contacts with said inlet pipe;
    wherein said mid-deck defines a flow control orifice disposed proximate said outlet orifice, said flow control orifice providing fluid communication between said upper chamber and said lower chamber.

2. The separator system claimed in claim 1 wherein said walls define a top opening and a bottom opening, said top opening being located proximate said inlet orifice and said bottom opening being in communication with said lower chamber.

3. The separator system claimed in claim 2 wherein said inlet orifice has a flow direction and said diffuser further includes a plurality of vertically oriented spaced apart vanes attached to said front wall and disposed parallel to said flow direction for dispersing a fluid flow moving from said top opening to said bottom opening.

4. The separator system claimed in claim 3 wherein said vanes are spaced apart further at said bottom opening than at said top opening.

5. The separator system claimed in claim 3, wherein said walls include a back wall spaced apart from said front wall and wherein said back wall is disposed transverse to said flow direction.

6. The separator system claimed in claim 5, wherein said vanes each extend perpendicularly between said front wall and said back wall.

7. The separator system claimed in claim 2, wherein at least some of said walls are flared outwards at a bottom end such that said top opening is smaller than said bottom opening, thereby diffusing fluid flow through said diffuser.

8. The separator system claimed in claim 1 further including at least one baffle extending upwards from said bottom within said lower chamber between said diffuser and said flow control orifice.

9. The separator system claimed in claim 1, wherein said flow control orifice is defined by an interior diameter of a flow control pipe extending from said mid-deck downwards into said lower chamber.

10. The separator system claimed in claim 9, wherein said flow control pipe includes a collar defining said interior diameter, said collar being removably attached to said flow control pipe.

11. The separator system claimed in claim 1, wherein said at least one sidewall includes four sidewalls in a rectangular formation.

12. The separator system claimed in claim 1, wherein said sheet piling includes steel sheet piling.

13. The separator system claimed in claim 12, wherein said steel sheet piling includes Z-type steel sheet piling.

14. The separator system claimed in claim 1, further including an oil extraction pipe providing fluid communication between said lower chamber and said upper chamber, said oil extraction pipe extending upwards from said mid-deck into said upper chamber.

15. The separator system claimed in claim 1, further including said pipe coupled to said at least one side wall and defining said inlet orifice and an outlet pipe coupled to said at least one side wall and defining said outlet orifice, said inlet pipe and said outlet pipe being adapted for attachment to sewer pipelines.

16. The separator system claimed in claim 1, wherein said inlet orifice defines a flow path and wherein said walls include aback wall spaced apart from said front wall, and wherein at least a portion of said back wall is disposed transverse to said flow path.

17. The separator system claimed in claim 1, wherein said walls of said diffuser are substantially vertical for directing fluid flow from said inlet orifice downwards into said lower chamber.

* * * * *